Jan. 3, 1967  W. W. BURNS ET AL  3,295,675
PACKAGE OF OUTER UNSTERILE AND INNER STERILE COVERS FOR
ENCLOSING A SUBSTANTIAL PORTION OF AN OBJECT
HAVING AN UNSTERILE SURFACE
Original Filed May 22, 1961  3 Sheets-Sheet 1
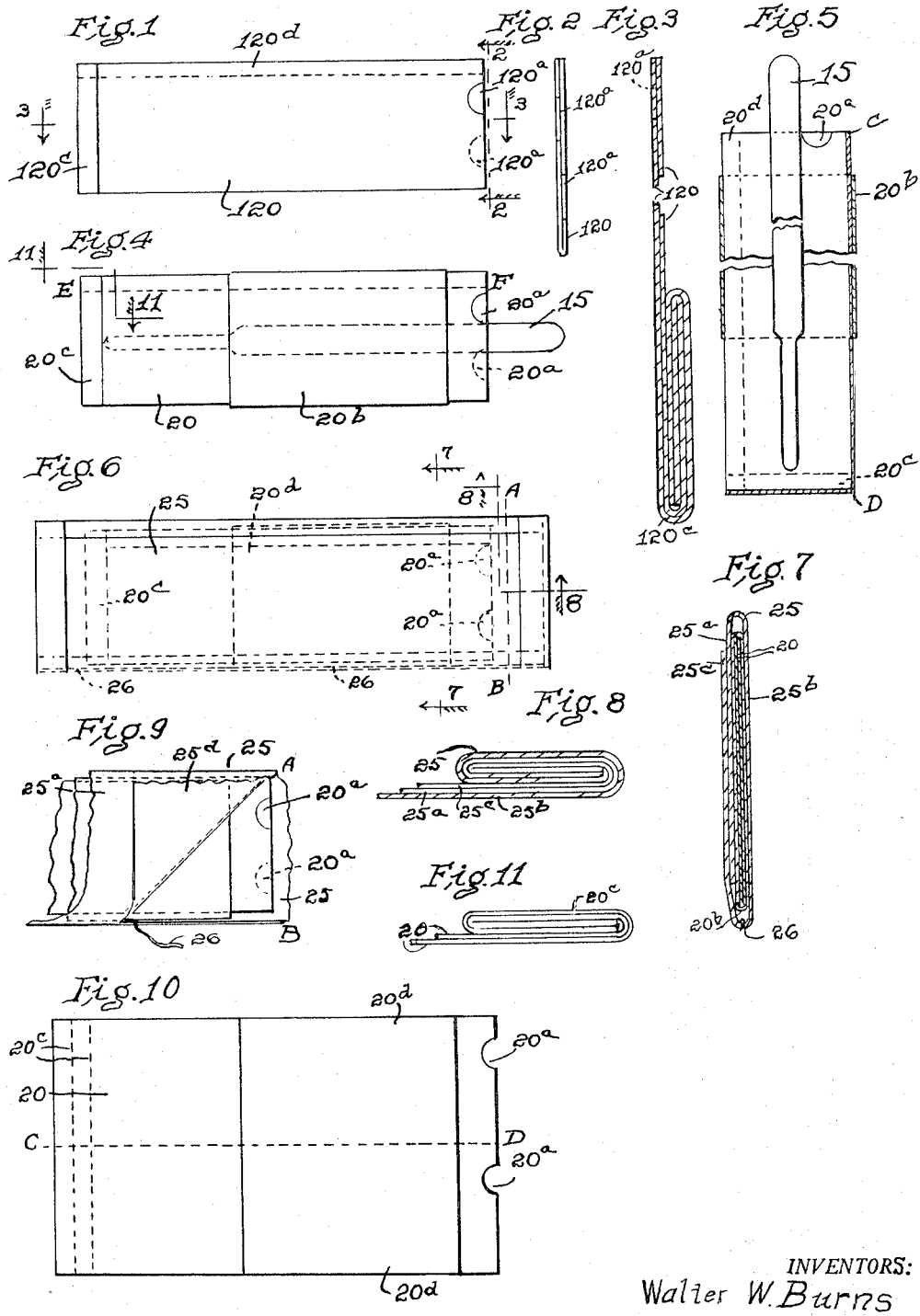
INVENTORS:
Walter W. Burns
BY Jacob L. Brause
Walter W. Burns
Attorney

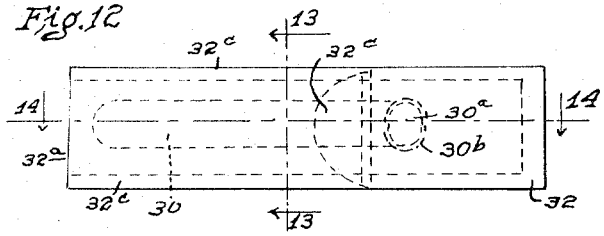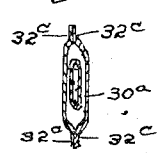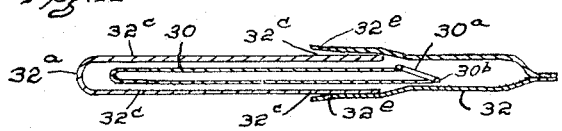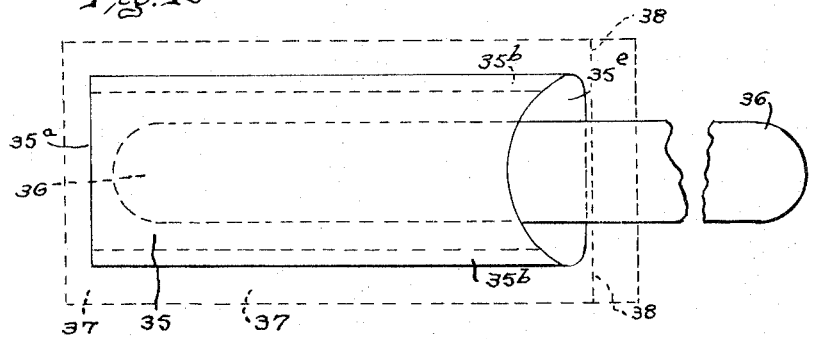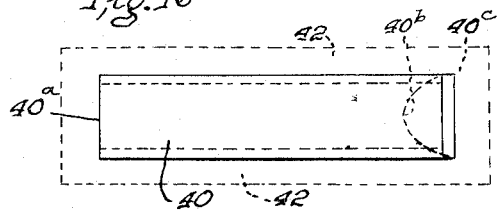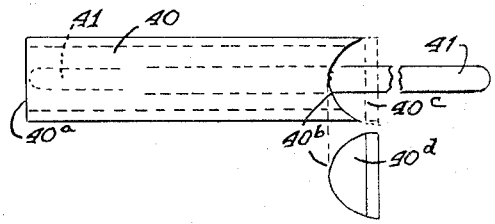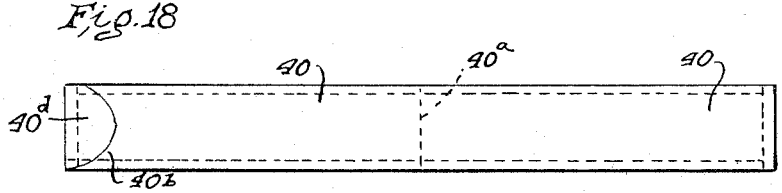

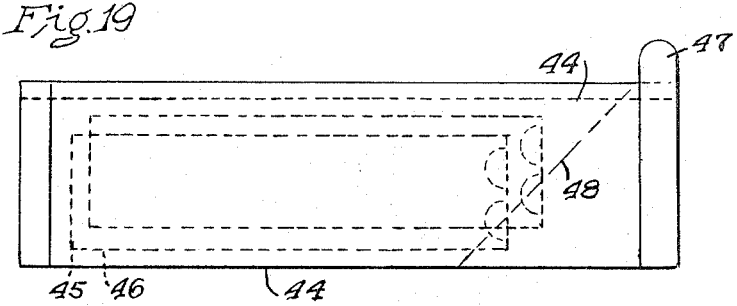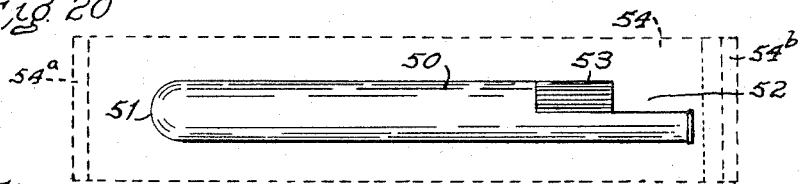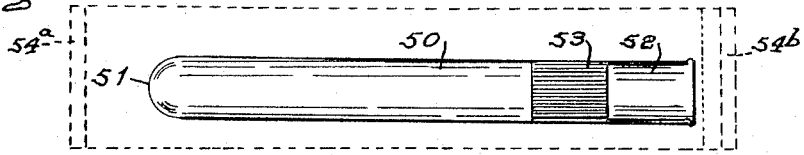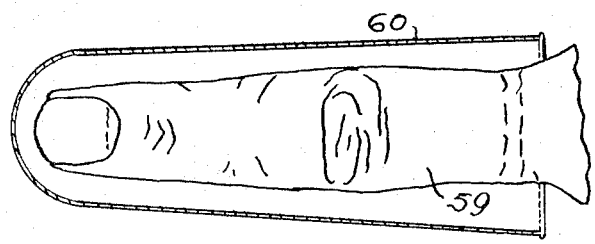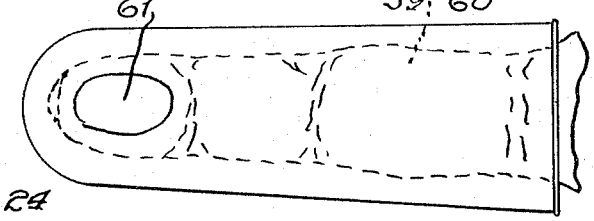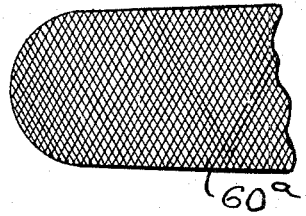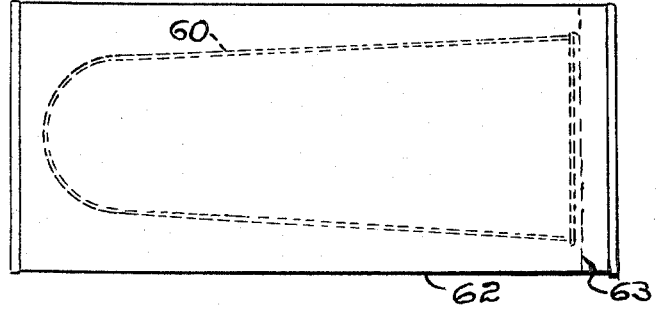

United States Patent Office 3,295,675
Patented Jan. 3, 1967

3,295,675
PACKAGE OF OUTER UNSTERILE AND INNER STERILE COVERS FOR ENCLOSING A SUBSTANTIAL PORTION OF AN OBJECT HAVING AN UNSTERILE SURFACE
Walter W. Burns, Greenport, N.Y., and Jacob L. Brause, Washington, D.C., assignors, by direct and mesne assignments, to Steri-Therm, Inc., Arlington, Va., a corporation of Virginia
Original application May 22, 1961, Ser. No. 119,889, now Patent No. 3,092,252, dated June 4, 1963. Divided and this application June 3, 1963, Ser. No. 284,893
The portion of the term of the patent subsequent to June 4, 1980, has been disclaimed
5 Claims. (Cl. 206—63.2)

This application is a division of our copending application S.N. 119,889, filed May 22, 1961, now Patent No. 3,092,252 dated June 4, 1963.

This inventioin is applicable on a wide scale and may be used for preventing cross-contamination by a clinical thermometer, a tongue depressor or other object, as for example, the human hand which it may be necessary to insert into the human oral cavity.

In the use of clinical thermometers, for example, as in the home or in hospitals, there is always a problem in having the thermometer aseptic or sterile. This problem is more acute where the thermometer is used in the mouths of a plurality of patients, any one of which may be a carrier of some disease, the pathological bacteria or virus of which may be lodged in the mouth of a patient using the thermometer. In the past, certain precautions have been taken to kill or render ineffective the bacteria or virus, after and/or before the use of the thermometer by each patient. It has been found that these precautions have not always been effective.

For this reason and to make the thermometer or other operative object safe for use, the problem has been approached from the point of view of making the use of the thermometer or other object safe for use in the patient's mouth, even though no effort has been made to make the surface of the thermometer or other operative object aseptic or sterile, prior to its use.

In describing this invention, we have used the term "object" or "operative object" for the reason that the invention is one which may be operated with a clinical thermometer, a tongue depressor or some other surgical or medical device or by the human hand, as when the cover is used to protect the mouth or lips from infection from the human hand.

The term aseptic or sterile is meant to describe and include the conditions existing on the outside wall of the inner envelope and the inside wall of the outer enveloping member as the inside envelope and the outside envelope form the protective package. These conditions are meant to include all conditions which, however produced, would not transmit, by contact thereof, any injurious or contamination disease caused by pathological bacteria or virus. The conditions may be brought about by any suitable method. Included are irradiation, gas application either directly or indirectly through the wall of an enveloping or envelop member, sterilizing or aseptic condition-producing powders or liquids which are not injurious to human beings.

The primary object of this invention is the provision of a clean, tight seamless container or cover for that portion of the thermometer or other operative object from which might otherwise come into contact with the human body, as in the mouth or rectum, and which has been or may be previously made sterile or aseptic to prevent cross-contamination and the spread of pathological bacteria or virus, thus preventing spread of disease.

Still another object of the invention is the production of a flexible seamless cover for a clinical thermometer or other operative object which cover will have a clean sterile, aseptic surface for contacting the human body and protecting the thermometer or other operative object from coming into contact with the human body while in use, the cover having a protecting enveloping member for maintaining the sterile aseptic condition.

A still further object of the invention is the production of a disposable flexible seamless cover for a clinical thermometer or other operative object having a protecting enveloping member for protection of the contacting surface until contact is made with the human body as it is used, the cover and enveloping member having adjacent sterile aseptic surfaces to prevent cross-contamination of the human body from the thermometer or other operative object.

Still another object of the invention is the production of a relatively impervious sterile aseptic cover for clinical thermometers or other operational objects for preventing the thermometer or other object from touching the human body, the cover only contacting the human body when in operation and an enveloping member for the cover to maintain the aseptic sterile condition until used.

Still another object of the invention is the production of a package having an inner cover and an outer enveloping member surrounding the cover, the outer enveloping member being of a type to permit the rendering of the outer surface of the cover member aseptic and sterile without removing the outer enveloping member from the inner cover member.

A further object of the invention is the production of a cover for clinical thermometers or other operative objects, the cover having a pouch-like heat-conducting body with a beaded opening and a sterile aseptic outer surface, the outer surface of the cover being protected by an outer enveloping member for enclosing the cover and protecting the sterile aseptic surface from contamination until time for use.

A further object of the invention is the production of a package comprising an inner enveloping seamless cover for clinical thermometers or other operative objects, the outer surface of the inner cover being rendered sterile, aseptic in any suitable manner such as by sterilizing the outer surface of the inner cover by irradiation or by suitable gas application thereto, by penetration through the body of an outer enveloping protecting member which envelops the inner cover member, or by coating the inner cover with any suitable sterilizing liquid or powder which is not objectionable as dangerous or distasteful and continuing the protective envelopment of the inner cover member until such time as it may be used.

A further object of the invention is the provision of a seamless cover having a beaded opening for a clinical thermometer or other operative object where the object would come into contact with the human body, the cover having a clean, sterile, aseptic metallic surface to contain the operative object, there being a non-electric-conducting surface to protect the teeth from galvanic action, an outer enveloping member covering the cover member to protect and maintain its septic, sterile, clean condition.

Still another and further object of the invention is the provision of a method of protecting the mouth of the user against pathological, bateriological or virus infection or contamination, which comprises the making of an inner relatively impervious seamless pouch-like envelope or cover of heat-transmitting material for receiving the bulb-end of a clinical thermometer, the placing of a non-galvanic material over the area which would come into contact with the teeth of the user, the placing of a second enveloping member over the first inner envelope or cover, the rendering of the package free of pathological bacteria, virus, and other micro-organisms which might transmit disease, the opening of the outer enveloping member, the insertion of the thermometer into the inner cover or envelope and the removal of both the thermometer and the inner envelope as a unit, with the thermometer therein and placing the unit into the mouth of the patient without touching the mouth-contacting portion of the inner envelope or cover with the hand of the operator, or any other operative object of possible contamination.

Still another and further object of the invention is the provision of a method of protecting the mouth of the user of a clinical thermometer or other operative object against contamination, which comprises the making of a sterile aseptic seamless pouch-like inner envelope or cover of heat transmitting material for the bulb-end of a clinical thermometer, or other operative object, of placing this cover in an enveloping member until time for use, the rendering of the outside of the envelope or cover clean by sterilization or other suitable method, the removal of the outer enveloping member and the placing of the thermometer or other operative object into the inner cover or envelope and insertion of the thermometer and cover into the mouth of the patient, the thermometer or other operative object being inside the envelope or cover when so placed.

Other and further objects of the invention will be apparent to those skilled in the art from a reading of the complete specification.

Referring to the drawing wherein we have illustrated embodiments of our invention:

FIG. 1 is a plan view of one form of our invention, showing an inner envelope without the insulator to guard against galvanic action.

FIG. 2 is a view taken from the line 2—2 of FIG. 1.

FIG. 3 is a greatly enlarged sectional view on the line 3—3 of FIG. 1.

FIG. 4 is a view similar to FIG. 1 but having the insulator in place to guard the teeth fillings of the user against galvanic action and showing the position of the clinical thermometer when in place.

FIG. 5 is a sectional view taken between the folds of the inner envelope of FIG. 4, and taken with the clinical thermometer in place.

FIG. 6 is a view of the outer envelope with the position of the inner envelope indicated.

FIG. 7 is a sectional view taken on the line 7—7 of FIG. 6 and much enlarged.

FIG. 8 is a detail cut-away view of the fold at each end of the outer envelope, as shown in FIG. 6.

FIG. 9 is a detail view of the outer envelope with its end torn away for the insertion of the clinical thermometer, the released end portion of the outer envelope being folded back for convenience of entering the thermometer into the inner envelope.

FIG. 10 is a pattern of the form of the inner envelope illustrated in FIG. 4.

FIG. 11 is a detail cut-away view of the fold at the bulb-end of the inner envelope, the fold being somewhat similar to that of FIG. 8.

FIG. 12 is a plan view of the package showing a modified form of one-piece tubular inner cover member and a modified form of outer package with flaps for opening the outer enveloping member to expose to view the inner cover member.

FIG. 13 is a cross-sectional view of the package taken on the line 13—13 of FIG. 12.

FIG. 14 is a longitudinal sectional view taken on the line 14—14 of FIG. 12.

FIG. 15 is a modified form of the invention showing the inner cover member made large enough to receive a tongue depressor 36 and with the outer enveloping member indicated conventionally in dotted lines at 37.

FIG. 16 is a modified form of inner cover member which is closed at both ends and is provided with a weakened line to aid in opening.

FIG. 17 is a view of the inner cover member shown in FIG. 16 but with the flap torn over and with a clinical thermometer therewithin, ready for use.

FIG. 18 is a pattern of the inner cover member shown in FIGS. 16 and 17.

FIG. 19 is a view of an outer enveloping member with an opening flap member 47 adapted for pulling open one end of the enveloping member along a weakened line 48, and showing the outer envelope enclosing a pair of conventional inner cover members, for use if it is desired to have a nurse use the pair with two clinical thermometers in the mouths of patients in adjacent beds.

FIG. 20 is a side view of an inner cover member of the tubular type showing an opening 52 with a color to mark the edge of the opening.

FIG. 21 is a side view taken from a point at 90° from that of FIG. 20, showing the top of the opening and a color band to indicate the edge of the opening.

FIG. 22 is a longitudinal sectional view of an inner cover member 60 shown as being used to cover the finger 59 of a user.

FIG. 23 is a view of the outside of an inner cover member 60 showing its use with a user's finger on the inside of the cover member and a patch 61 of medicated material on the outside of the cover member in a position to be used by the underside of the finger 59 as indicated in dotted lines on this figure.

FIG. 24 is a plan view of an outer enveloping member 62 showing the inner cover member 60 in dotted lines and showing the line 63 to indicate where a cut should be made to expose the end of the inner cover member 60 for insertion of the user's finger.

FIG. 25 is a fragmental view of an inner cover member 60ª having an outer roughened surface to assist a nurse or doctor in the massage of a patient's gum.

In the drawing and specification, the same reference characters refer to the same or similar parts.

The illustrated construction comprises an inner cover or protecting member for the bulb-end of a clinical thermometer, the outer surface of which, at least, is sterile, aseptic clean. The terms—sterile clean, aseptic—are intended to include a condition in which the surface is free from pathological bacterial virus, or other microorganisms which, if present, might communicate a disease to the user. The construction also includes an outer covering or enveloping member which as an enclosing fold or envelope to preserve the sterile, clean, aseptic condition of the outer surface of the inner envelope or enclosing member.

The inner enclosing cover member, as an envelope, is illustrated in the first-described embodiment as being made from a sheet 20 as shown in FIG. 10 of the drawing. This sheet 20 is preferably provided with two cutaway places 20a for a purpose to be later set forth.

Across the portion of the sheet 20 which when in use would otherwise contact the teeth of the user may be placed a sheet or coating of nongalvanic nature when the sheet 20 is of a galvanic nature or an electrical conductor. This is to prevent the formation of a galvanic battery which might take place if the sheet 20 is of metal and should contact a metallic filling of a tooth in the mouth of the user.

The strip 20 is folded along the line C–D of FIG. 10 and the edges 20ᵈ of the fold are suitably secured together along the line E–F of FIG. 4. These edges 20ᵈ may be cemented, heat-sealed or crimped or secured together by any suitable or well-known method to make them moisture tight.

One end of the folded inner envelope may be, though not necessarily left open and the other end closed as shown in FIGS. 4, 6 and 11. The method of closing the end of the inner envelope at the left in FIGS. 4, 6 and 11 may be by cementing, heat-sealing or any other well-known or suitable method, after which, the end is preferably folded and sealed as at 20c, as a safety precaution against accidental forcing of the clinical thermometer 15 through the bottom of the inner envelope. This folded portion is shown greatly enlarged in FIG. 11.

In FIG. 1, we have illustrated the completed inner envelope in a simpler form without any insulating band corresponding to the band 20b of FIGS. 4 and 6. In this showing, the sheet 120 is provided with the cut-away portions 120a and the portions 120d are secured together as described for the portions 20d. After the portions 120d are secured together, the folds 120c are formed as described for the folded portion 20c of FIGS. 4 and 11.

The material for the inner envelope body portion 20 or 120 may be of metal such as thin sheet tin or aluminum but may be made of any material as a suitable plastic which is practically or sufficiently impervious to moisture and which will properly conduct heat from the mouth of a user to the bulb of the clinical thermometer when the envelope is in place about the bulb. When a plastic sheet is used, seams may be closed by heat-sealing.

When the band 20b is used, this band may be of suitable paper, cloth or any other material which will perform the necessary function, such as a coating of paint or plastic which may be applied in the solid or liquid form, after which it will dry to form a proper insulating coating.

The outer envelope or covering is such that it will protect the inner envelope from contamination—in other words, its purpose is to protect the clean outer surface of the inner envelope. This outer envelope is made from a sheet 25 with two folds forming three parts 25a, 25b, 25c, which overlap each other, as indicated in FIG. 7. The sheet 25 when folded has a space within its folds large enough to receive the inner envelope 20 or 120 with space to spare. There is sufficient length to the folded outer envelope 25 at its ends to provide for a folded portion at each end as illustrated in FIGS. 6 and 8 and still leave plenty of space for the inner envelope 20.

In making the outer envelope, the inner envelope is inserted between the folds of the outer cover or envelope 25 as the folds are made. At the same time, there is inserted a "rip cord" 26 which extends the full length of the cover or envelope 25. This cord is shown at 26 in FIG. 7, in cross section and its longitudinal position is indicated by the dotted line in FIG. 6. It will be observed that when the ends of the outer cover or envelope 25 are folded as illustrated in FIG. 8 the ends of the cord 26 will be wrapped in the respective end folds. In this way, the ends are held firmly with relation to their respective folds.

When it is desired to use the clinical thermometer 15 in the mouth of the patient to take the patient's temperature, it is not necessary to treat the outside of the thermometer each time between ordinary uses. Regardless of whether or not the thermometer has been treated to have a clean, sterile, aseptic outside surface, the inner envelope will protect the patient's system against the infection of his mouth from any pathological bacteria, virus or other micro-organisms which may be on the surface of the thermometer.

In use by a right-handed person, the package as illustrated in FIG. 6 is grasped by the left hand, the right hand being used to grasp and tear the folded end of the outer cover or envelope along substantially the line A–B as illustrated in FIG. 9. As the folded end is torn off, further movement of the folded end away from the outer envelope will cause the "rip cord" 26 to tear the fold of the outer envelope which is nearest the operator. This will expose the open end of the inner envelope 20 and place a cut-away opening 20a in position for the insertion of the clinical thermometer 15.

The thermometer is pushed, bulb-end first, into the inner envelope until the bulb-end engages the closed folded end 20c of the inner envelope 20. The inner envelope is then and not until then removed from the outer cover or envelope member 25, care being taken to touch only the surface of the inner envelope 20 near the open end. This is natural if used by a right-handed person, in this manner, since the thermometer 15 and inner envelope 20 will be held in the right hand of the operator while the inner envelope 20 is removed from the outer cover or envelope 25. It is to be observed that as the "rip-cord" 26 cuts the fold between the folded portions 25b and 25c, a flap 25d which is a part of the fold 25a will be loosened. This flap 25d facilitates the entry of the bulb of the thermometer to the inside of the inner envelope 20 by the cut-away portion 20a.

After the inner envelope 20 with the clinical thermometer 15 therein is free of the outer cover or envelope 25, it is inserted in the mouth of the patient below the tongue and the temperature taken in the usual manner. The insulating cover member 20b will then be in a position so that the member 20 if of a metallic substance, cannot come into contact with any metal of a tooth or filling. If this protection were not present and the metallic covering of the inner envelope came into contact with a metallic filling, a galvanic action would at one take place and give the patient a very disagreeable sensation.

No inconvenience is experienced from the use of the inner envelope since this envelope should be of a material which will assist in the transmission of the heat of the mouth to the bulb of the thermometer and quickly bring the reading of the thermometer to the temperature of the body of the patient or other user. After use the inner envelope 20, or 120, is discarded.

In rectal use, the inner cover member 20, 120 is preferably wrapped about the thermometer to reduce its bulk and then covered with vaseline. In rectal use the operation of the parts is similar except that the insulating band 20c would have no function.

In FIGS. 12 and 13, I have illustrated another form of the invention which has a different type of inner cover member and a different type of outer enveloping member, either of which can be used with other and inner members of different type according to the needs indicated.

The inner cover member is of a closed-at-one-end-type, and which I have designated by the reference character 30. It is tubular in form. This tube is of a flexible material, as a soft plastic which is soft enough to cling close to the thermometer or other operative object. The dimensions are such that a clinical thermometer may be readily inserted into one end and long enough to enclose enough of the thermometer so that the walls of the mouth will not be touched when in use. In order to facilitate the insertion of the thermometer into the open-end of the tubular inner cover member 30, there is provided, at the open end, an enlarged bead 30b which will hold the side of the tubular member away from the opposite side so that the opening may readily be entered by the tubular end of the thermometer to facilitate getting it ready to place within the mouth of the patient. In order to assist in this insertion, the axis of the opening 30a of the tubular member 30, may be made at an angle to the axis of the tube 30, as shown in FIG. 12. This construction will assure that the opening 30a is always open.

The outer enveloping member 32 (FIGS. 12, 13, 14) shown for enclosing the inner cover member 30 is composed of three members, a main body portion which has two folded portions 32c folded on a fold 32a. The two opposite sides of the portions 32c of the outer enveloping member are heat-sealed at opposite edges to form a pocket for the reception of the inner cover member 30. Two removable portions 32c are sealed at the ends of and integral with respective portions 32c and are provided with free flaps 32e and form a part of the enveloping member. In operation, these flaps are so sealed that they, while tight, are easily peeled of to expose the inner cover member 30 while still leaving in place, the portion comprising the parts 32c for handling the unit without touching the inner cover member or envelope in a way to contaminate its surface. In using the package, usually the stripping off of one flap portion 32e is sufficient to expose the inner cover member 30 for the insertion of the clinical thermometer or other operative object. When so exposed, the operative object is inserted into the inner cover member 30 and the cover member and thermometer are removed as a unit, from the outer enveloping member and then inserted in the mouth of the patient, as in the case of a clinical thermometer to measure the temperature of the body.

FIG. 15 is a plan view of an inner cover envelope, which is illustrated of a size, after opening the outer enclosing member, to enclose an end of a tongue depressor. The inner cover envelope 35 is made with a sheet of sufficient size to easily receive a tongue depressor 36. The length of the inner cover member 35 is sufficient to make an envelope large enough to receive all of that portion of the tongue depressor which would normally come into contact with the mouth of a patient. The outer enveloping member is diagramatically shown in dotted lines to indicate that the inner cover member can be used with any suitable outer enveloping member large enough to receive it and is not confined to any one form of outer enveloping member.

The inner cover member 35 is here shown as an envelope having a single fold 35$^a$ and being sealed, at the sides, 35$^b$ as by a suitable cement or by heat treating to seal the two edges together. The end 35$^e$ is open. In use, the tongue depressor 36 is inserted into the inner cover member 35 after the outer enveloping member 37 has been suitably opened at the open end of the inner cover member 35. As with the other forms of the invention, the outer enveloping member conventionally shown at 37 is held in the hand of the user as protective means for the inner cover member therein until the tongue depressor and inner cover member 35 are removed, as a unit, from the outer enveloping member 37, and inserted into the mouth of the patient. As in the other units described, some means for identifying the edge of the opening 35$^e$ is provided, as the cutting away of one side of the opening 35$^e$, as shown.

In FIG. 16 we show an inner cover member 40 having both ends closed and having a weakened line 40$b$ at the end adjacent to the end of the outer enveloping member 40 which is conventionally shown and will be opened. This inner cover member 40 may be made of one piece having a weakened line 40$b$ which when torn along the weakened line 40$b$ will make a differently-shaped edge above its opposite edge 40$c$ in such a manner that an opening will be clearly presented to the thermometer bulb 41 or the end of the operative object to be inserted. This is shown in FIG. 17 where the end 40$d$ is torn from its original place along the weakened line 40$b$ and opened up for the insertion of the thermometer illustrated in FIG. 17. The inner cover member 40 is shown removed from the outer enveloping member 42 which is indicated diagrammatically in the dotted lines of FIG. 16. It will be understood that while tearing the outer enveloping member 42 open, the outer enveloping member and the inner cover member will be held firmly together to prevent touching the inner cover member with hands, thus protecting the inner cover member from cross-contamination from the user's hand.

FIG. 18 shows the outline of a pattern of the inner cover member 40 before the fold along the line 40$a$ is made. This illustrates the position of the dotted line 40$a$ where the fold is to be made and also the weakened line 40$b$ to assist the tearing operation.

In FIG. 19 we have shown diagrammatically the use of an outer enveloping member 44 and a plurality of conventional inner cover members 45, 46, therein where it might be desired, to have a plurality of inner cover members within the same outer enveloping member 44, the latter to be opened by the nurse in the presence of two patients in adjacent beds. It is understood that the particular type of inner cover member would be any illustrated cover member or its equivalent, at the option of the manufacturer, or user. In this form, we show an outer enveloping member 44 having heat-sealed, cemented, glued or folded side and end edges shown in FIGS. 6, 8, 9 and 11 but having a tab 47 at one corner to indicate the end of the outer enveloping member to be opened and to grasp and hold when opening the outer enveloping member 44 along the weakened line 48. This tab member may be separate from and attached to the corner of the outer enveloping member or it can be integral with the fold portion, as desired.

In each of the types of inner cover members, it is preferable that the opening at the insertion end be of a type to show clearly, or have something to designate, the edge of the opening, whereby the thermometer bulb or other inserting end of the operative object may be more easily inserted. In furtherance of this desire to have the operative object easily insertable, I have shown another method in FIGS. 20 and 21 where is illustrated, a flexible inner cover member 50 of a material which will lie close to a thermometer bulb and which has a closed end 51 and an irregular opening 52 at the opposite end. One edge of the opening 52, I have illustrated as being of blue color 53 to designate the edge of the opening nearest the open end of the tubular member. When the inner cover member is held within the outer enveloping member at a point just below the opening 52, the edge 53 of the opening may be easily seen and the thermometer or other operative object may easily be inserted. This blue edge 53 at the opening 52 of the tubular inner cover member is for the same purpose as the cut-away portions shown in FIG. 1, and 10 and the off-axis opening 30$a$ of FIG. 12 or the beaded edge of that opening.

The material of which the inner cover may be made, may be varied as to weight in order to make the inner cover member sufficiently stable to hold steady as the operative object, such as the thermometer, the tongue depressor or the operator's finger or hand is inserted, the means for identifying the edge of the opening of the inner cover member being varied to adapt it to the use for which the cover is intended. Certain grades and weights of sheet plastics have been found to be suitable. It is here noted that when used with a thermometer, the material of the cover member must be sufficiently pliable to cling close to the bulb of the thermometer and be of a material to conduct the body heat to the thermometer bulb in order to have the thermometer register the proper reading within a reasonable time. As already pointed out, it is advantageous to have the opening of the inner cover member clearly defined by either a configuration of the opening or a differentiation in color or shade.

The material for the outer enveloping protective member which protects the inner cover member has a wide range in selection. It is pointed out that while some substances resist the use of irradiation as a means of sterilization, other materials do not, and it is possible to reach the outer walls of the inner cover member with irradiation through some materials readily while other materials display marked resistance to its passage and use.

In this way a wide range in the selection of the material is permitted. However, the conditions under which the inner cover is to be used and the degree of protection needed must be considered. For example, where the inner cover member would be used under military field conditions, the outer enveloping protective member would be safer if made of a plastic material than if a cloth or paper enveloping member is used.

On the other hand irradiation might not be suitable for creating an aseptic sterile situation where a heavy sheeting of some plastic material is used for the outer enveloping protective member.

For field use with the military forces, the outer protective enveloping member would be more efficient if waterproof, flexible and transparent.

The materials used for the respective uses should be carefully considered in connection with the use to which the inner cover member is to be used and the treatment of the package as a whole prior to actual use.

It is also pointed out that the size must be such as to readily admit insertion of the operative object.

In this specification, and as claimed, the terms sterile and aseptic are used. These terms are not used in a limiting sense and are intended to include any and all means and processes which bring about conditions within the outer enveloping member which will protect the person or animal with which the inner cover member is used, from any pathological bacteriological organisms or viruses which would cause or result in cross-contamination.

The operative object as a clinical thermometer, is inserted within the inner cover member before the latter is removed from the outer enveloping protective member, after which the operative object with the inner cover member surrounding it is inserted in the mouth of the patient. The body heat from the mouth will be transmitted from the patient to the thermometer bulb through the inner cover member without the passage of the mouth liquid through the inner cover member.

It is here noted that some plastic sheets which are porous under some conditions to a very slight extent will be a proper protection since the plastic material of the inner cover member will, during the short time it is in the mouth, have a tendency only to pass the mouth fluid from the mouth to the inside of the inner cover member since the pressure is all in that direction.

It is to be understood that while several types of inner envelopes and several types of outer envelopes are disclosed, the different types of inner envelopes may be used interchangeably with the outer envelopes of proper size and different types of outer envelopes may be used interchangeably with the inner envelopes, making such changes as to size and form as may be needed for the different types of operative objects for which the package is designed and for the types to which they are to be put.

In FIG. 22 is shown an inner cover member 60 of very flexible material suitable for receiving an operative object as a human finger 59. A spot of lotion or massaging material 61 is provided on the outside of the inner cover member 60 as shown in FIG. 23.

FIG. 24 illustrates the inner cover member 60 encased in an outer enveloping member 62 which is provided with a line 63 by which the nurse may cut the end of the outer enveloping member 62 away and miss the end of the inner cover member exposing the latter for the insertion of the finger.

In FIG. 25 is illustrated a detail of the end of an inner cover member which may be made of thicker material and roughened to aid massage.

It is to be understood that the detailed method of producing the outer sterile aseptic surface of the inner cover member, which encloses the operative object such as the clinical thermometer, is not a part of this invention, and ways of using material which may be maintained in a sterile aseptic condition by treating the material before or during manufacture; by irradiation or by suitable gas which will pass through or into the chamber between the outer surface of the inner cover member and the inner surface of the outer enveloping member will be within the knowledge of one skilled in the chemical arts. One such agent which may be used is a gas, ethylene oxide

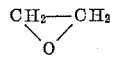

It is particularly noted that this package is opened in the presence of the patient and that the outer enveloping member is discarded when opened and the inner cover member is discarded as soon as it is taken from the patient's mouth and the operative object is removed.

It is contemplated that in the use of this invention hospitals may desire to conduct their own sterilization of the package and that they will receive the packages ready for sterilization but not sterilized.

It is to be understood that the structures of FIGS. 22, 23, 24 and 25 may be used with the finger and if desired, with lip-stick paste—as in a beauty parlor.

We claim:
1. A package which is designed to protect the mouth of a patient from contamination by bacteria or virus which may be on an operative object such as a clinical thermometer or the like, said package comprising in combination:
    (a) an inner cover member having a chamber of a size and shape to enclose a substantial portion of an operative object such as a clinical thermometer, or the like, and protect the mouth of the patient from contact with the operative object,
    (b) said inner cover having an angular opening and a tubular seamless side wall and a seamless closed end for insertion into the mouth of the patient and for holding the lower end of the operative object, which may be contaminated, out of contact with the patient's mouth and extending outwardly beyond the mouth opening,
    (c) said cover being of an impervious material, and of a thickness to permit ready transfer of the body heat from the patient's mouth to the thermometer bulb,
    (d) said material being flexible to permit it to be readily conformed to and in contact with the outer surface of the thermometer over a large area,
    (e) an outer enveloping member having an opening indicating means and for enclosing the inner cover member to enclose the same and to provide protection therefore, the
    (f) inner cover member having an outer sterile aseptic surface for separating the operative object from contacting the mouth of the patient, thereby giving protection to the patient against bacterial and virus contamination in the patient's mouth, from the operative object, and
    (g) said inner cover member when open lying in the outer enveloping member in a position to permit the ready insertion of the thermometer or other operative object without removing said cover member from the outer enveloping member, and without touching the part of the inner cover member which comes into contact with the patient's mouth to any contaminating surface.

2. A package which is designed to protect the mouth of a patient from contamination by bacteria or virus which may be on the surface of an operative object such as a clinical thermometer or the like, said package comprising in combination:
    (a) an inner cover member having a chamber of a size and shape to enclose a substantial portion of a clinical thermometer, or the like, and protect the tissue of an opening in the human body of a patient, from contact with the said thermometer,
    (b) said inner cover having an angular opening and a tubular seamless side wall and a seamless closed end for insertion into an opening of the human body of a patient and for holding the bulbous end of the thermometer, which may be contaminated, out of contact with the body opening, and covering said thermometer outwardly beyond the edge of the body opening of the patient.
    (c) said cover being of an impervious heat conductible material, and of a thickness sufficient to permit ready transfer of the body heat from the patient to the thermometer bulb,
    (d) said material being flexible thus permitting it to be readily conformable to and in contact with a large surface area of the thermometer when inserted therein,
    (e) an outer enveloping member for packaging the inner cover member and enveloping the same and to provide mechanical and antiseptic and aseptic protection to the inner cover member, the
    (f) inner cover member having an outer sterile aseptic surface for separating the thermometer from contact with the body of the patient, thereby giving protection to the patient against bacterial and virus contamination from the thermometer to the tissues of the patient's body.

3. A package which is designed to protect the mouth of a patient from contamination by pathological bacteria or virus which may be on an operative object such as a clinical thermometer or the like, said package comprising in combination:
   (a) an inner cover member having a chamber of a size and shape to enclose a substantial portion of an operative object such as a clinical thermometer, or the like, and protect the mouth of the patient from contact with the operative object,
   (b) said inner cover having an angular opening and a tubular seamless side wall and a seamless closed end for insertion into the mouth of the patient and for holding the lower outer end of the operative object which may be contaminated, out of contact with the patient's mouth and covering said operative object outwardly beyond the patient's mouth opening,
   (c) said cover being of an impervious heat conductable material and of a thickness to permit ready transfer of the body heat from the patient's mouth to the thermometer bulb,
   (d) said material being flexible thus permitting it to be readily conformable to and in contact with the surface of the thermometer bulb over a large area,
   (e) an outer enveloping member for packaging the inner cover member to envelop the same and to give protection therefor, the
   (f) inner cover member having an outer sterile aseptic surface for separating the operative object from contacting the mouth of the patient, thereby giving protection to the patient against pathological bacterial and virus contamination in the patient's mouth, from the operative object, and
   (g) the outer enveloping member being in position to permit the thermometer to be inserted into the inner cover while the outer enveloping member and inner cover member are held together and fitting the inner cover loosely enough to permit ready removal of the inner cover member and thermometer as a unit from the outer enveloping member without touching the mouth-contacting portion of the inner cover with the hands while the unit is inserted in the patient's mouth.

4. A method of protecting the human body of a patient against pathological bacteria and virus which may be attached to the surface of an operative object which includes the following steps:
   (a) of providing an inner cover member having an angular opening and a tubular seamless side wall and a seamless closed end and of a size and shape to permit ready insertion of an operative object to cover the operative object to a point beyond the position of the entrance to the mouth of the patient when the operative object is in the mouth, enclosed in the inner cover member,
   (b) the envelopment of said inner cover member without the operative object by said outer enveloping member large enough to permit ready removal of the inner cover member from the outer enveloping member,
   (c) the treatment of the package by a sterilizing agent which will enter the outer envelope and contact the outer surface of the inner cover member and render the inner cover member sterile, aseptic
   (d) one end of the outer enveloping member for exposing the end of said inner cover member,
   (e) the placing of the operative object into the inner cover member without removing the inner cover member from the outer enveloping member,
   (f) removing the inner cover member and the operative object, as a unit, from the outer enveloping member without permitting the inner cover member to touch the hand or any instrumentality which might carry pathological bacteria or virus contamination,
   (g) placing the operative object and the inner cover member, as a unit, into a human body opening of the patient without removing it from the inner cover member and permitting only the uncontaminated portion of the inner cover member to contact the patient's body orifice,
   (h) thus using the operative object for a medical-surgical purpose, without permitting the operative object to come into contact with the patient, and thereby
   (i) protect the patient from cross-contamination from the operative object.

5. A method of protecting the human body of a patient against pathological bacteria and virus which may be attached to the surface of a clinical thermometer which includes the following steps:
   (a) the providing of an inner cover member having an angular opening and a tubular seamless side wall and a seamless closed end and of a size and shape to permit ready insertion of a clinical thermometer to cover the thermometer to a point beyond the position of the entrance to the mouth of the patient when the thermometer is in the mouth, enclosed in the inner cover member,
   (b) the envelopment of said inner cover member without the thermometer by said outer enveloping member large enough to permit ready removal of the inner cover member from the outer enveloping member,
   (c) the treatment of the package by a sterilizing agent which will enter the outer envelope and contact the outer surface of the inner cover member and render the inner cover member sterile,
   (d) the opening of the outer enveloping member for exposing the said inner cover member,
   (e) the placing of the clinical thermometer into the inner cover member without removing the inner cover member from the outer enveloping member,
   (f) removing of the inner cover member and the thermometer, as a unit, from the outer enveloping member without permitting the inner cover member to touch the hand or any instrumentality which might carry pathological bacteria or virus contamination,
   (g) placing the thermometer and inner cover member, as a unit, into a human body opening of the patient without removing it from the inner cover member and permitting only the uncontaminated portion of the inner cover member to contact the patient's body orifice,
   (h) and using the thermometer to take the temperature of the body of the patient without permitting it to contact the patient, and thereby
   (i) protect the patient from cross-contamination of the body from the thermometer.

References Cited by the Examiner
UNITED STATES PATENTS

| | | | |
|---|---|---|---|
| 2,365,556 | 12/1944 | Karg | 206—64.2 |
| 2,749,020 | 6/1956 | Baxter | 229—48 |
| 3,092,252 | 6/1963 | Brause et al. | 206—16.5 |

LOUIS G. MANCENE, *Primary Examiner.*

THERON E. CONDON, WILLIAM T. DIXSON, Jr., *Examiners.*